April 22, 1958

D. H. THORBURN 2,831,714

PACKING ELEMENT

Filed July 12, 1954

INVENTOR.
David H. Thorburn,
BY
Wilkinson, Huxley, Byron & Hume
Attys.

April 22, 1958     D. H. THORBURN     2,831,714
PACKING ELEMENT
Filed July 12, 1954     2 Sheets-Sheet 2
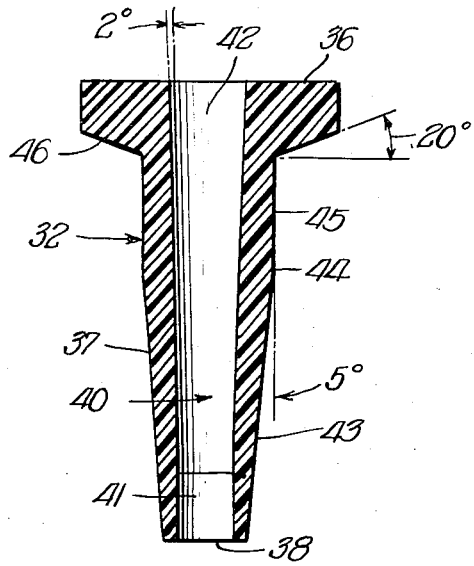
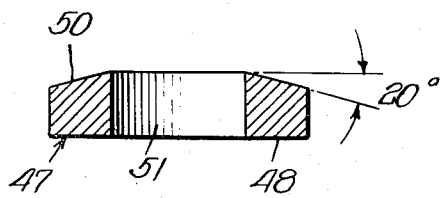
INVENTOR
David H. Thorburn,

United States Patent Office 2,831,714
Patented Apr. 22, 1958

2,831,714

PACKING ELEMENT

David H. Thorburn, Oak Park, Ill., assignor to The Powers Regulator Company, Skokie, Ill., a corporation of Illinois Application July 12, 1954, Serial No. 442,768

2 Claims. (Cl. 286—35)

The invention relates to the art of sealing a movable rod or shaft and has reference in particular to an improved packing element for sealing the reciprocating stem of a valve or the shaft of a pump and other devices of this nature where one end of the shaft is given motion in a medium at one pressure and the other end of the shaft imparts motion to a mechanism in a medium at a different pressure.

A general object of the invention resides in the provision of a packing element which may be formed of a synthetic plastic and wherein said element by reason of its special shape and composition is able to produce a seal which will remain effective over a wide range of temperatures without requiring adjustment on the packing gland, which will have a very low frictional resistance, and which will be chemically inert to substantially all chemicals such as may come into contact with the packing element.

More particular objects of the invention are to provide a packing for a valve or the like which will have complete chemical and solvent resistance, to provide a valve packing which will have anti-adhesive properties whereby the packing element can not freeze even though the valve may not be operated on for long periods, and to provide a packing assembly which will produce an effective static seal with its housing in addition to forming a satisfactory dynamic seal with the movable stem or shaft, and wherein both seals will have a long life although the packing assembly may be subjected to large temperature differences during normal operating periods.

The packing element of the invention may be made of "Teflon," a trade marked plastic which can be chemically described as consisting of poly-tetra-fluoroethylene, and which has unusual resistance to practically all chemicals, coupled with the ability to withstand high temperatures. Accordingly, another object of the invention is to provide a "Teflon" packing element which will have a special shape for association with a washer of elastomeric material, whereby a sealing contact is maintained with its housing as well as with the movable stem or shaft notwithstanding the high coefficient of expansion of the "Teflon" material.

Another object is to provide a general purpose packing which will not require field adjustment although the temperature and pressures of the medium to which it is subjected may vary over a wide range, and to provide such a packing which will produce effective static and dynamic seals and which will require little or no maintenance attention over long periods.

As regards the packing element of the present invention, the expansion of the "Teflon" material at high temperatures and the high pressures to which the packing element is subjected have been employed in a manner to assist in providing a dynamic seal with the movable stem or shaft. However, to provide an effective static seal between the packing element and its housing, the said invention incorporates additional structural features which are based on an entirely new and novel concept. Therefore, a still further object is to provide a packing element which is designed for association with a resilient washer of rubber-like material and wherein the parts have such interfitting relation at normal temperatures as to provide a space to permit the rubber washer to flow during high temperature conditions whereby to prevent the application of excessive pressures on the packing element, such as may produce permanent deformation, so that an effective sealing contact is maintained at all times with the valve stem and with the wall of the valve housing.

Another object resides in the provision of a plastic packing element which will be relatively simple to manufacture although capable of a long life under adverse conditions, and which will be further characterized by a low initial cost in addition to low maintenance costs.

With these and various other objects in view, the invention may consist of certain novel features of construction and operation as will be more fully described and particularly pointed out in the specification, drawings and claims appended thereto.

In the drawings which illustrate an embodiment of the invention, and wherein like reference characters are used to designate like parts—

Figure 3 is a vertical sectional view of the packing element of the invention;

Figure 4 is a sectional view of the rubber washer which is designed for association with the packing element to form the static seal; and Figure 5 is a sectional view of the metal washer which may be employed as a supporting member for the valve packing element.

Figure 1:
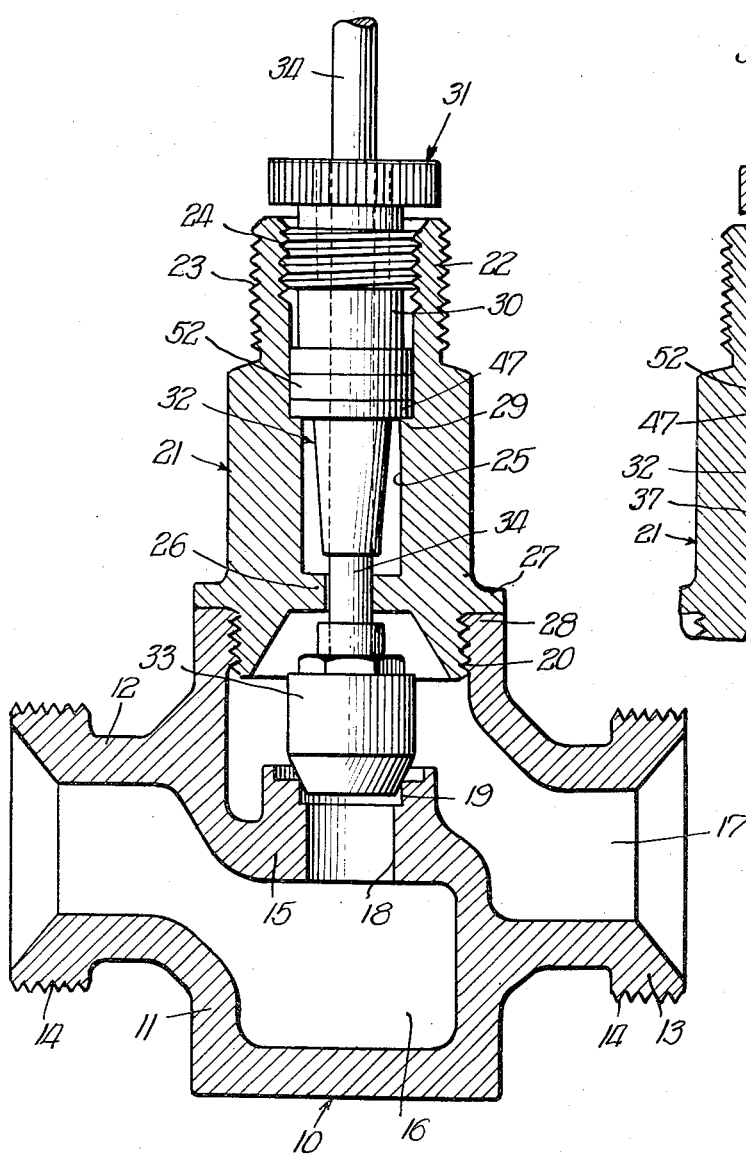
Figure 1 is a vertical sectional view taken through a conventional valve showing the same equipped with the improved packing element of the invention.

The invention is illustrated as applied to a valve 10, Figure 1, conventional in design and construction, the same including a valve housing 11 provided with an inlet fitting 12 integral with the housing and with an outlet fitting 13, also of integral construction, both fittings being externally threaded as at 14 for clamping relation, respectively, with an inlet supply pipe and with an outlet pipe, which elements, however, are not shown.

The valve housing 11 is provided with the partition wall 15 separating the inlet chamber 16 from the outlet chamber 17, the said partition wall having the passage 18 provided with valve seat 19. Said valve housing is additionally threaded as at 20, the threads being located internally for threaded connection with complementary threads on the bonnet 21. The bonnet is generally cylindrical in shape, having a top section 22 externally and internally threaded as at 23 and 24 and also having an internal bore 25 which is open at its top but closed at its bottom by the transverse wall 26. When bonnet 21 is properly connected with valve housing 11 it will be seen that flange 27 seats on rim 28 whereby the bonnet forms a closure for the outlet chamber 17.

The threads 23 at the top of the bonnet 21 make it possible for a valve part, such as a motor housing base, to be connected to the bonnet, whereas, the internal threads 24 receive the threaded end 30 of the gland nut 31, which closes the bore 25 and functions to retain the packing element within the said bore. The valve member 33 has associated relation with the valve seat 19 and is adapted to be moved toward and from the seat by reciprocation of the valve stem 34 whereby the passage 18 of the valve may be opened and closed. The valve stem extends through the transverse wall 26, through the packing element 32 and through the gland nut 31, and in accordance with the invention, the packing element 32 has a special constructional shape and is composed of a plastic to provide an effective seal for the valve under all operating conditions.

Figure 2:
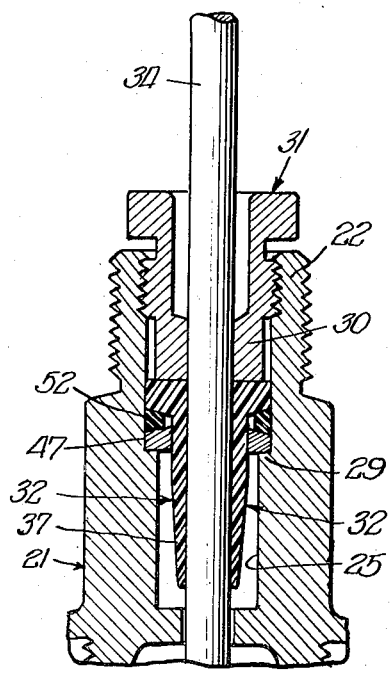
Figure 2 is a fragmentary sectional view of the valve bonnet showing the packing element in cross section and illustrating the association of the various parts with the bonnet and valve stem.

As best shown in Figures 2 and 3, it will be seen that the packing element 32 is generally cone shaped, having a base 36, a tapering body portion 37, and an apex 38. A passage or bore 40 extends through the packing element from the base 36 to the apex 38. The size of the packing element and the diameter of said bore will vary, depending on the size of the valve and valve stem with which the element is to be associated. The cylindrical portion 41 of the bore, which is located adjacent the apex 38, has a diameter such as to provide a close fit with the valve stem. The remainder of the bore, including the entire portion above 41, and which is identified by numeral 42, has a slight taper, so that the bore has its maximum diameter adjacent the base 36. The outward taper of the bore 42 in most instances will not exceed two or three degrees.

Another important feature concerning the shape and configuration of the present packing element resides in the fact that the same gradually increases in thickness from the apex end 38 to the base end 36. The exterior walls of the element taper outwardly as at 43 from said apex end to a mid-section point 44 a short distance below the base 36. This taper or slope as regards the exterior surface of the packing element is not particularly critical, although it is desirable that the inside tapering of the bore be less than the said exterior taper adjacent the apex end of the element. From the base 36 to its mid-section point 44 the element has cylindrical exterior walls 45 and it will also be observed that the side walls of the base portion 36 are likewise cylindrical. However, in accordance with the invention the lower surface 46 of the base portion is upwardly and outwardly bevelled, the taper thereof being approximately twenty degrees with respect to the horizontal.

As shown in Figure 2, the packing element 32 is inserted in the bore 25 with its apex end 38 directed downwardly toward the transverse wall 26. The shoulder 29, provided by the bonnet on the inside surface of bore 25, supports the metal washer 47. Said metal washer has a flat bottom surface 48 and an outwardly sloping top surface 50. The taper of said outwardly sloping top surface will generally be the same as the taper of the undersurface 46 of the packing element base which in the illustrated embodiment approximates an angle of twenty degrees. Also said metal washer 47 is provided with a center opening 51 of a size equal to the diameter of the packing element along the cylindrical portion 45 thereof. The metal washer 47 provides a support for the packing element 32, the said element extending through the central opening 51 of the washer and thus it will be understood that the shoulder 29 could be so tapered as to provide a surface such as 50, in which case the metal washer 47 could be eliminated.

Before the packing element 32 is assembled with its supporting surface 50 a resilient washer, preferably of silicon rubber such as 52, is deposited on the same and thus with the insertion of the packing element the rubber washer is confined between the tapering surfaces 46 and 50. The outside diameter of the base 36 of the packing element is approximately equal to the inside diameter of bore 25 above the shoulder 29 as is also the rubber washer 52 and the supporting washer 47. Therefore the elements of the packing assembly have an insertable fit within the bore above shoulder 29, and, as previously described, the packing element at its apex end has a close sliding fit with the valve stem. In accordance with the invention, the rubber washer 52 has a central opening 53 of a diameter somewhat greater than the diameter of the cylindrical portion 45 of the packing element, all as clearly shown in Figures 2 and 3. As a result a space is provided between the rubber washer and the packing element when normal temperatures prevail. The reason for this space and the mode of operation of the present packing assembly will now be described.

In assembly the parts of the present packing device within the bore 25, the metal washer 47 is first inserted in the bore and the same is caused to rest on and be supported by the shoulder 29. The rubber washer 52 is then located within the bore and caused to contact the top surface 50 of the metal washer. The packing element 32 is then telescoped over the valve stem 34 and moved down on the valve stem to within the bore 25, the said element being inserted through the center openings of the rubber and metal washers 52 and 47. The assembly is maintained within the bore 25 by the gland nut 31 and by tightening the gland nut the desired pressure can be applied to the packing assembly.

The packing element has a close sliding fit with the valve stem by reason of the cylindrical portion 41 of the bore and the remainder of said bore is tapered outwardly to a slight extent in order to provide clearance between the packing element and the valve stem. As a result of this clearance accurate machining of the valve parts is not absolutely necessary, the valve stem is able to reciprocate more freely, and any interference to the proper setting of the packing element is completely eliminated. An effective seal is maintained at this active end of the packing element since the pressures within the bore 25 are such as to force the apex end of the packing element into contact with the valve stem. Also at high temperatures the expansion of the packing element tends to reduce the diameter of the cylindrical bore 41 and thus an increasingly tighter seal is provided as the pressures and temperatures to which the valve is subjected may increase. The static seal, that is, the sealing relation which the packing element 32 may have with the bonnet is effected by the base of the packing element in coaction with the rubber washer 52.

The diameter of the base 36 and the diameter of said washer 52 is such as to have an insertable fit within the bore 25 above shoulder 29. Also the tapering of the surfaces 46 and 50 are such as to exert an outward pressure on the resilient washer, causing the same to contact the cylindrical walls of the bore. Under all operating conditions the structure will effectively prevent the escape of fluids along the valve stem as well as along the cylindrical walls of the bore. In the first place, it will be understood that the pressure applied to the packing assembly by the gland nut will insure a tight sealing fit of the rubber washer 52 with respect to the bonnet. Secondly, when high temperature fluid such as steam is caused to flow through the valve, the material of the packing element expands to a considerable degree by reason of its high coefficient of expansion. As a result the rubber washer is squeezed between the sloping surfaces of its confining groove and a tight seal with the bonnet is produced. However, were it not for the space which has been provided, as previously explained, excessive pressures would be applied to the "Teflon" material of the packing element which, in some instances, might exceed the elastic limit of the material. In order to assure return of the material of the packing element to its original shape and size following operating periods of high temperature, said space is provided, as described, between the rubber washer 52 and the packing element 32 so that the rubber washer can flow upon expansion of the packing element, and accordingly relieve or substantially prevent the application of said excessive pressure to the element.

By using the packing assembly of the invention an effective active seal can be maintained at all times with the valve stem and due to the composition of the packing element very low frictional resistance is applied to the stem. In addition the packing element will not freeze to the stem even though the valve may not be operated for long periods since the packing material has anti-adhesive properties which prevent such freezing. Also an effective static seal is maintained with the cylindrical walls of the bore 25. Under abnormal operating conditions as well as under normal operating conditions the packing element and its associated rubber washer coact in a manner to maintain the said static seal and which is accomplished effectively with low initial cost and with low maintenance costs.

In addition to valves such as illustrated in the drawings other typical applications of the invention would include pumps and pneumatically operated temperature control instruments. Therefore the invention is not to be limited to or by details of construction of the particular embodiment thereof as disclosed since various other forms and uses of the packing will of course be apparent to those skilled in the art without departing from the spirit of the invention or the scope of the claims.

What is claimed is:

1. The combination with a housing having a passage through the same and having a movable rod extending through the passage, of a packing assembly for effecting a seal between the movable rod and the housing, said housing providing a shoulder intermediate the length of the passage, and said packing assembly including an elongated, tubular packing element located within the passage and having surrounding relation with the movable rod, said element having the general shape of a cone and including a base having a close insertable fit within the passage above the shoulder, a tapered apex end located below the shoulder, and a cylindrical mid-portion of a diameter less than the base, the apex end of the packing element having a close sliding fit with the rod to form a seal therewith, a resilient washer of rubber-like material in surrounding relation with the cylindrical mid-portion of the packing element and in contact with the base thereof, the opening in the washer through which the packing element extends being greater in diameter than the associated mid-portion of the packing element, a metal washer located between the resilient washer and said shoulder and in supported contact on the shoulder, whereby the resilient washer is confined between the base and the metal washer and is adapted to coact therewith to form a seal with the walls of the passage, and means retaining the packing element and washers in assembled relation with the parts under the desired initial pressure.

2. The combination with a housing having a passage through the same and having a movable rod extending through the passage, of a packing assembly for effecting a seal between the movable rod and the housing, said housing providing a shoulder intermediate the length of the passage, and said packing assembly including an elongated tubular packing element of poly-tetra-fluoroethylene and located within the passage and having surrounding relation with the rod, said element having the general shape of a cone and including a base having a close insertable fit within the passage above the shoulder, a tapered apex end located below the shoulder, and a cylindrical mid-portion of a diameter less than the base, the apex end of the packing element having a close sliding fit with the rod to form a seal therewith, a washer of resilient material in surrounding relation with the mid-portion of the packing element and in contact with the base thereof, a metal washer located between the resilient washer and said shoulder, said metal washer having contact with the cylindrical mid-portion of the packing element and said washer also having supported contact on said shoulder, whereby the resilient washer is confined between the base and the metal washer and is adapted to coact therewith so as to form a seal with the walls of the passage, the surfaces of the base and metal washer with which the resilient washer contacts being tapered to form a groove therebetween and which increases in width in a radially outward direction, whereby the resilient washer under pressure is forced in a direction outwardly and into contact with the walls of the passage.

References Cited in the file of this patent

UNITED STATES PATENTS

| | | |
|---|---|---|
| 447,261 | Shortt | Feb. 24, 1891 |
| 756,880 | McIntire | Apr. 12, 1904 |
| 1,106,933 | Farley | Aug. 11, 1914 |
| 1,313,202 | Mustor | Aug. 2, 1919 |
| 1,363,565 | Christensen | Dec. 28, 1920 |
| 1,414,357 | Harris | May 2, 1922 |
| 2,430,918 | Curry | Nov. 18, 1947 |
| 2,599,149 | Allen | June 3, 1952 |
| 2,613,962 | Dahl | Oct. 14, 1952 |
| 2,670,973 | Ginther | Mar. 2, 1954 |
| 2,692,152 | Tremolada | Oct. 19, 1954 |
| 2,721,749 | Crow | Oct. 25, 1955 |

FOREIGN PATENTS

| | | |
|---|---|---|
| 320,744 | Great Britain | Oct. 24, 1929 |
| 182,147 | Switzerland | Apr. 16, 1936 |
| 715,496 | Germany | Dec. 23, 1941 |